United States Patent [19]
Konno et al.

[11] Patent Number: 5,204,868
[45] Date of Patent: Apr. 20, 1993

[54] OPTICAL ISOLATOR AND METHOD FOR ASSEMBLING SAME

[75] Inventors: Yoshihiro Konno, Kawaguchi; Hiroshi Kume, Tokyo, both of Japan

[73] Assignee: Namiki Precision Jewel Co., Ltd., Tokyo, Japan

[21] Appl. No.: 721,482

[22] PCT Filed: Nov. 13, 1990

[86] PCT No.: PCT/JP90/01465
§ 371 Date: Jul. 12, 1991
§ 102(e) Date: Jul. 12, 1991

[87] PCT Pub. No.: WO91/07684
PCT Pub. Date: May 30, 1991

[30] Foreign Application Priority Data

Nov. 14, 1989 [JP] Japan ................. 1-296337
Jun. 7, 1990 [JP] Japan ................. 2-149617

[51] Int. Cl.$^5$ ................................. H01S 3/04
[52] U.S. Cl. ........................ 372/34; 372/108; 372/703
[58] Field of Search .......... 372/34, 703; 385/11, 385/12, 34; 359/484, 487

[56] References Cited

U.S. PATENT DOCUMENTS

| | | | |
|---|---|---|---|
| 4,367,040 | 1/1983 | Goto | 385/12 |
| 4,762,384 | 8/1988 | Hegarty et al. | 385/11 |
| 4,886,332 | 12/1989 | Wolfe | 385/11 |
| 4,952,014 | 8/1990 | Lieberman et al. | 385/12 |

FOREIGN PATENT DOCUMENTS

0219816  9/1989  Japan ................. 378/703

Primary Examiner—Leon Scott, Jr.
Attorney, Agent, or Firm—Sixbey, Friedman, Leedom & Ferguson

[57] ABSTRACT

In optical isolators composed of a polarizer, an analyzer, a Faraday rotator and permanent magnet for magnetizing the Faraday rotator for the Faraday effect, this invention enables controlling of the maximum isolation temperature in the 0° to 70° C. temperature range. When assembling the device at room temperature, the Faraday rotator's wavelength-dependence characteristics are used for this purpose. By varying the wavelength during the assembly and adjustment process by $\Delta\lambda$ from the wavelength at the device will be used, it is possible to set the temperature at which maximum isolation will be realized.

5 Claims, 5 Drawing Sheets

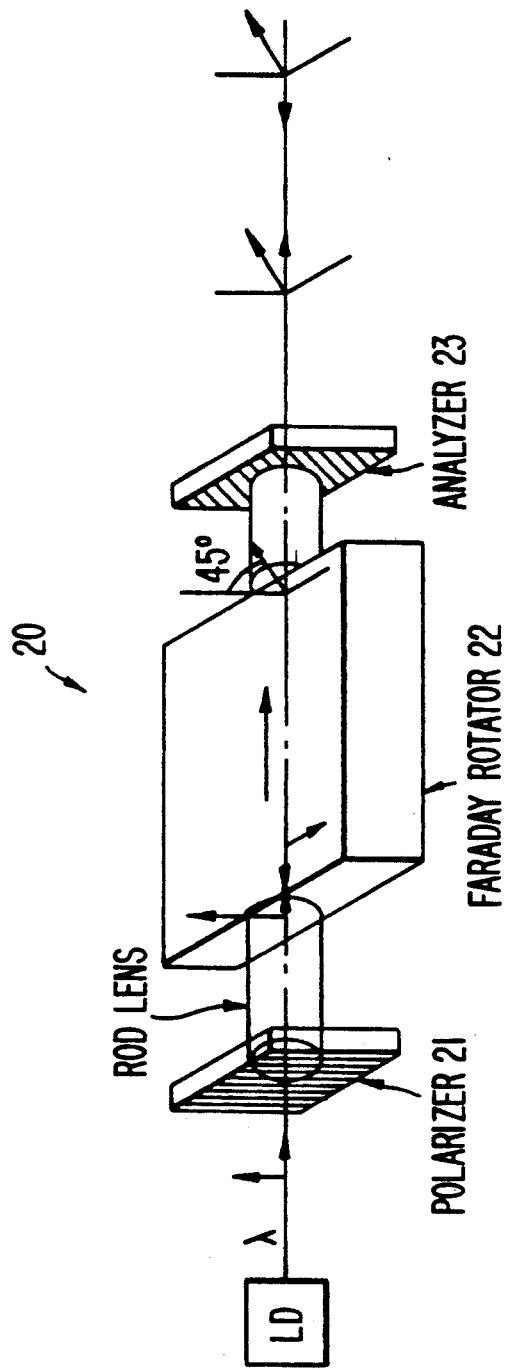

OPTICAL ISOLATOR AND METHOD FOR ASSEMBLING SAME

FIELD OF TECHNOLOGY

This invention concerns an optical isolator which uses temperature dependence to control the maximum isolation temperature.

BACKGROUND TECHNOLOGY

With the development of long-distance optic communications technology using LD (semiconductor lasers), optical isolators have been developed in order to prevent LD noise from reflected, returning light. With the proliferation of high density communications systems, the importance of these devices has grown considerably. The basic structure consists of a Faraday rotator composed of two polarizers and a garnet crystal, along with a permanent magnet to produce the Faraday effect by the magnetization of the Faraday rotator. For the polarizer, one could use a Rochon polarizing prism, polarized beam splitter, Grant-Thompson+prism, or polarized glass depending upon application. In order to achieve small size and a high magnetic field, a rare-earth permanent magnet is used. The Faraday rotator was the part which determined the characteristics of the optical isolator. There are currently two types of materials being used. One is where the FZ method is used to produce a bulk YIG ($\frac{1}{2}Fe_5O_{12}$) single crystal and the other is where the liquid phase epitaxial (LPE) method is used in order to produce a BiRIG (rare earth bismuth-ison garnet) film on a garnet type of substrate. The Faraday rotation angle $\theta_f$ is proportional to the thickness of the crystals, and $\theta_f$ per unit of length is different from each material. In order to obtain an angle $\theta_f=45°$ as required for an optical isolator, the YIG should be about 2 mm, and the BiRIG should be 200 to 500 μm. In consideration of mass production and lowered costs, after the FZ method has been used to obtain the bulk YIG, in order to produce the required shape on the substrate using the LPE method without wasteful machining, it is possible to produce a large film ¼ of the thickness but equivalent to the YIG in the Faraday rotator. This is of greet benefit for the economic proliferation of these elements. However, in u these YIG and LPE garnet crystals, there have some differences in optical characteristics which result in temperature or wavelength dependence in the Faraday rotation. FIG. shows the temperature dependence (a) and the wavelength dependence (b) of $\theta_f$ for a BiRIG. Depending on the materials, there are variations in the reverse slope, but generally, the $\theta_f$ corresponds to temperature and wavelength. Optical isolators are adjusted and assembled to have a maximum isolation at the wavelength and the ambient temperature which they are assembled. However, in temperature ranges from 0° to 70° C. where these devices will be practically used, near the temperatures at either end of this range (0° C. and 70° C.) the isolation characteristics tend to deteriorate. In YIG crystals, the Faraday rotation temperature dependence coefficient is generally $K_T=-0.04$ deg/° C. With the LPE method, in materials where there is essentially little absorption, it is $K_T=-0.04$ to $-0.07$ deg/° C. When the optical isolators are assembled at room temperature (about 23° C.), they are adjusted so that $\theta_f=45°$ at 23° C. However, if we assume the temperature coefficient of an LPE garnet element to be $-0.07$ deg/° C., then at the upper end of 23° C. ±20° C. (eg. 43° C.), $\theta_f=45 -0.07\times20=43.6°$. At the lower limit of 3° C., this becomes 46.4°. This greatly degrades the isolation due to the slippage from $\theta_f=45°$. In principle, isolation is $-10$ Log$[\sin^2(45-\theta_f)]$, so in the previous example, at 3° C. and 43° C. it would be 32 dB. The graph in FIG. 2 (1) shows the temperature dependence of isolation for a typical optical isolator. The peak of isolation is at 23° C., and it falls off below and above that temperature in a nearly symmetrical curve. In this case, when considering a temperature range from 0° to 76° C., at the limit temperatures, the Faraday rotation angle is 44 deg for 24→0° C. and 46 deg from 24→70° C. Table 1 shows the isolation at 0° C. and 70° C. when the isolation has an angular displacement angle $\Delta\theta$ from 45° according to $-10 \log (\sin^2 \Delta\theta)$ for YIG and LPE garnets (when the temperature coefficient$=-0.06$ deg/°C.).

TABLE 1

|           | Temp. Coefficient (deg/°C.) | Isolation (dB) 0° C. | Isolation (dB) 70° C. |
|-----------|-----------------------------|----------------------|-----------------------|
| YIG garnet | −0.04 | −35.5 | −29.9 |
| LPE garnet | −0.06 | −32.0 | −26.3 |

If we assume that 30 dB or greater of isolation is required from 0→70° C., then problems would appear with either method at the high temperature end of the range. In order to reduce this problem, the materials used in the Faraday rotator should have a low temperature coefficient, but at the current time, such low absorption materials are not available. The following methods can be considered as ways of providing high isolation at a temperature range of 0° to 70° C.:

1) Assemble the optical isolators at a temperature mid-way in the above range, eg. 35° C.

2) Produce isolators with a maximum isolation temperature of 35° C. by moving the polarizer angle of rotation $\Delta\theta$ from an angle of 45°.

3) Produce isolators with a maximum isolation temperature of 35° C. by deviating $\Delta\theta$ from the 45° Faraday rotation angle.

If the first of the above methods were used, an assembly system would have to be established where the ambient temperature was higher than room temperature. If the method 2) were adopted, during the mechanical displacement by $\Delta\theta$ from 45°, it would be impossible to fix the peak for the standard isolation, so the resulting products would have some fluctuation in their characteristics. In the case of 3), it would involve increasing or reducing the thickness of the Faraday rotator, and the $\theta\pm\Delta\theta$ adjustment would be complex. In any of the above cases, it would not be practical to implement such production.

Considering costs and production for a multi-purpose optical isolator (for optic communications of subscribers, Cable TV optic communication systems), it would be difficult to meet the requirements except by using the LPE method garnet. Thus, there is a demand for optical isolators which are produced using the LPE method but which have little absorption and are stable in the face of temperature variations.

SUMMARY OF THE INVENTION

In this invention, in the assembly of optical isolators comprised of polarizers, analyzers using Farady rotators, and permanent magnets to magnetize the Faraday rotators to produce the Faraday effect, the wavelength-dependence characteristics of the Faraday rotator are utilized by finely adjusting the wavelength Δλ so that the maximum isolation is exhibited at a temperature which is higher than the temperature at which the device was assembled.

When the temperature coefficient of Faraday rotation angle is $K_T$ and the wavelength coefficient is $K_\lambda$, then the variation in the Faraday rotation angle due to a small temperature change $\Delta T$ is adjusted by changing the wavelength $\Delta\lambda$ in order to compensate for this according to:

$$K_\lambda \Delta\lambda = K_T \Delta T \qquad (1)$$

This is the equivalent of the change in wavelength: $\Delta\lambda = (K_T/K_\lambda)\Delta T$. When optical isolators are normally assembled at room temperature $(T_R)$, they show their highest isolation capacity at that temperature. As a result, as shown in FIG. 2 (1), the peak value for the isolation is displaced somewhat to the low temperature side of $T_R$. However, if the $\Delta\lambda$ of equation (1) is brought into consideration, when optical isolators are assembled so that the maximum isolation is at a wavelength $\lambda \pm \Delta\lambda$ at room temperature, then the maximum isolation is at $T_R \pm \Delta T$ when operating at wavelength $\lambda$. In other words, if the change in Faraday rotation due to temperature is compensated by changing the wavelength at the time of assembly, the maximum isolation temperature could be controlled by changing the wavelength $\Delta\lambda$ according to equation (1). In cases where this is a module with the LD, then the LD should be produced with a tolerance of about ±30 nm. For optical isolators which are assembled to be used at a certain wavelength, this principle can be used as described. With an LD module, the temperature characteristics tend to vary considerably, so the wavelength of the LD can first be determined, and then the isolator can be assembled so that the maximum isolation temperature matches according to the adjusted wavelength as determined by Equation (1). This makes it possible to provide LD modules which have uniform temperature characteristics. Further, if maximum isolation is desired at a particular wavelength, then Equation (1) can be used to determine the assembly temperature at which this can be realized in order to get the characteristics desired at the designated wavelength.

BRIEF DESCRIPTION OF THE DRAWINGS

FIG. 7 is a schematic depiction of an optical isolator.

DETAILED DESCRIPTION OF THE PREFERRED EMBODIMENT

In FIG. 7, an optical isolator arrangement is shown which is composed of an optical isolator 20 which receive light of wavelength λ from a light source such as a semiconductor laser (laser diode) LD. Optical isolator 20 comprises a polarizer 21 and a Faraday rotator 22 which has a Faraday rotation element that is magnetized by a permanent magnet. The polarization of the light incident on the rotator is rotated so that reflected light can be cut off by polarizer 21 at the input end while transmitted light passes through the analyzer 23 at the exit end of the rotator 22. To this extent, FIG. 7 represents a conventional optical isolator and the inventive method and arrangement will now be described relative to the following examples.

EXAMPLE 1

Figure 1A:
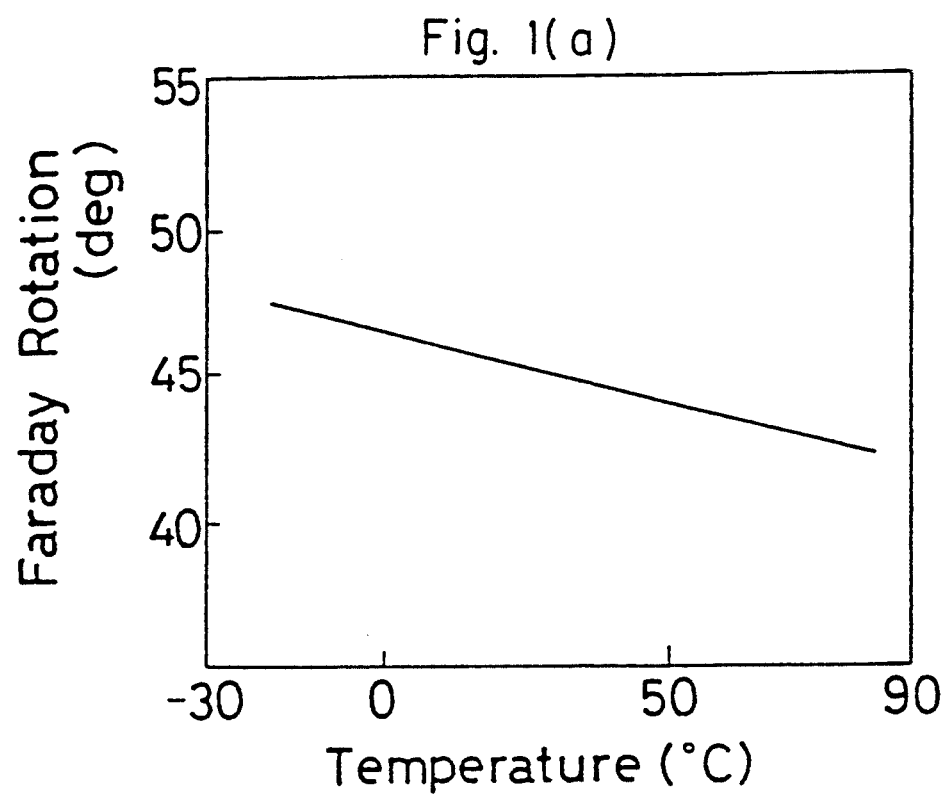
FIG. 1 contains graphs of the temperature dependence (a) and the wavelength dependence (b) of a BiRIG Faraday rotational angle $\theta_f$.
Figure 1B:
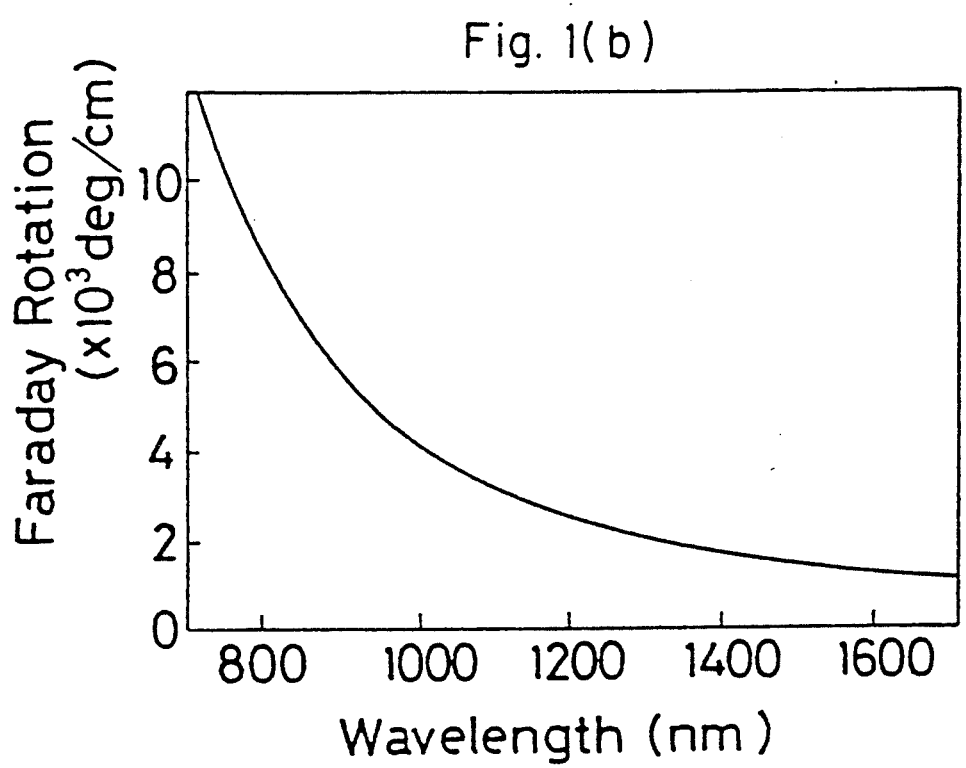
Figure 2:
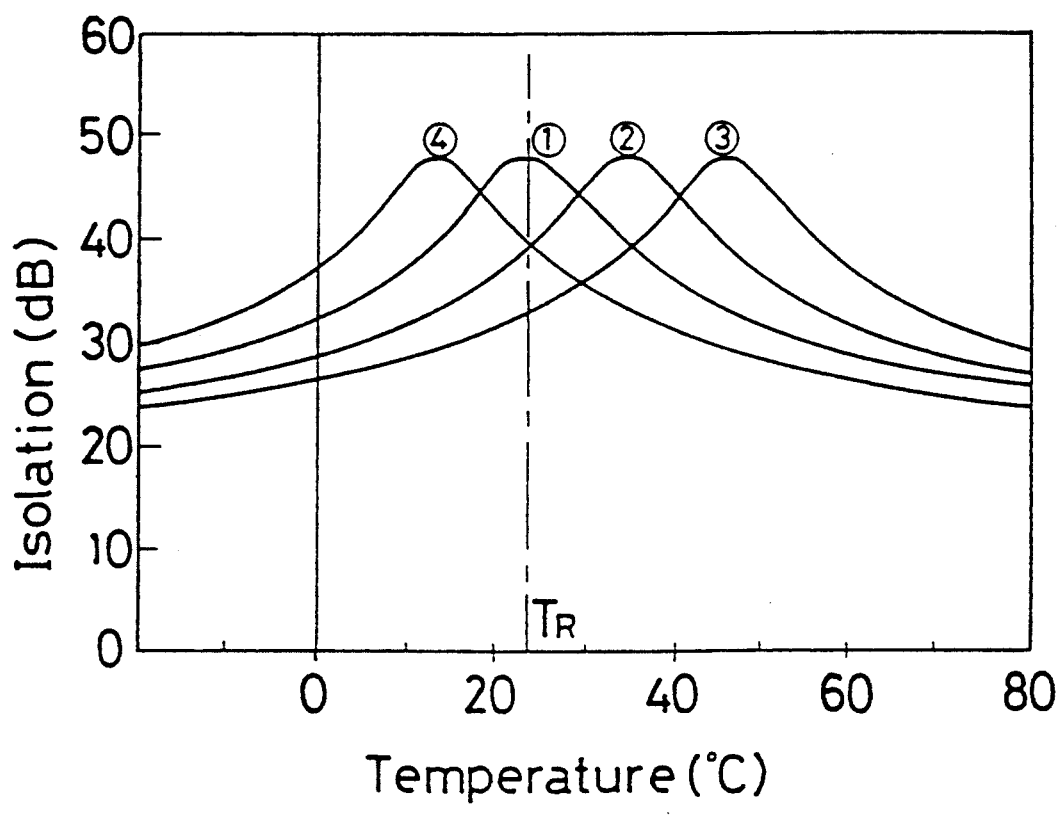
FIG. 2 is a graph showing the isolation temperature dependence of an optical isolator of this invention.

A Faraday element was used with a Faraday rotation capability which would allow a maximum isolation temperature of 34° C. as indicated in Equation (2). The isolator was assembled using an assembly wavelength of 1540 nm, as determined by Equation (3), at a temperature of 23° C. FIG. 2, curve (2) shows the temperature dependence of the resulting optical isolator when measured at a wavelength of 1550 nm. The maximum isolation temperature was 34° C. Similarly, (3) shows the curve for an isolator assembled at 1530 nm, and (4) shows the curve for one assembled at 1560 nm.

$$\theta_f = \frac{3619.7881}{\left(\frac{\lambda}{1000}\right)^{3.388}} + 435 \qquad (2)$$

Where $\theta_f$ is the Faraday Rotation (deg/cm) at wavelength λ(nm)

$$T_{ps} = \frac{\left(\frac{45}{\theta_{fc}} \times \theta_{fk} - 45\right)}{K_T} + T_r \qquad (3)$$

Where:

$\theta_{fc}$: The Faraday rotation capability (deg/cm) at the central wavelength $\theta_{fk}$: The Faraday rotation capability (deg/cm) at the adjusted assembly wavelength $T_r$: Assembly temperature $K_T$: Temperature coefficient (deg/°C.) for the Faraday rotator $T_{ps}$: Maximum isolation temperature Thus, in this example, where the actual wavelength is λ, then when a $\lambda \pm \Delta\lambda$ wavelength light source is used to adjust the maximum isolation angle, the desired maximum isolation temperature can be achieved for the optical isolator.

EXAMPLE 2

Figure 3:
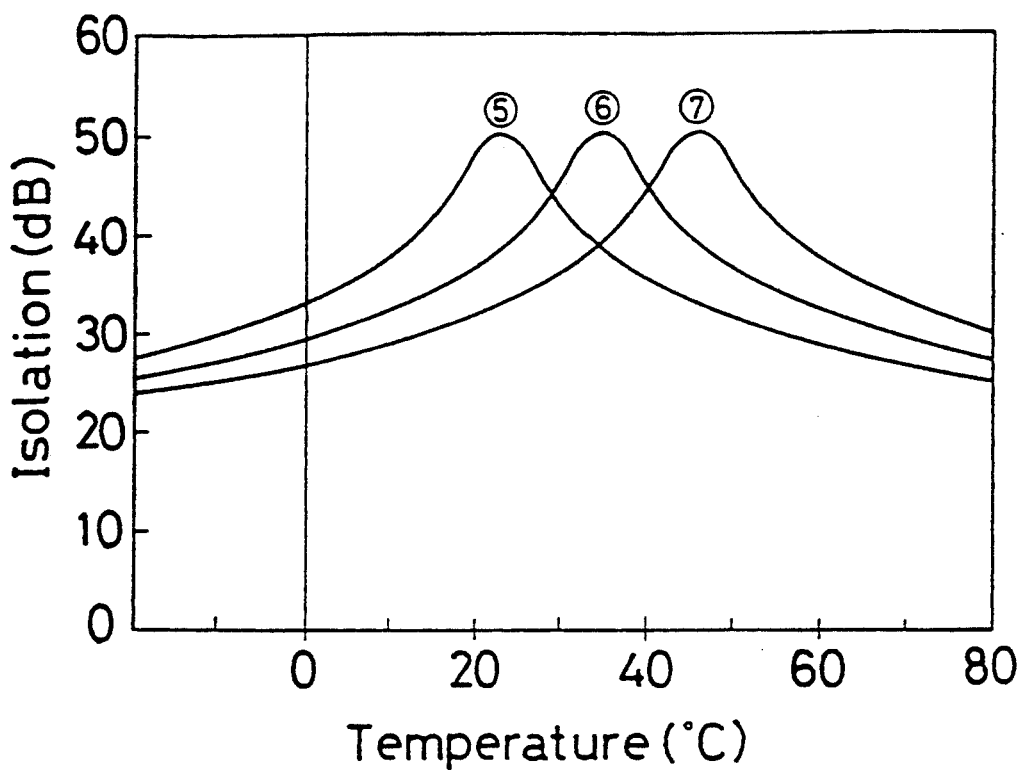
FIG. 3 is a graph showing the isolation temperature dependence of an optical isolator of this invention.

The wavelengths selected for assembly were λ=1310 nm, FIG. 3, curve (5), 1318 nm, FIG. 3, curve (6), and 1326 nm, FIG. 3, curve (7) and the temperature used for adjusting the maximum isolation was 23° C. After assembly, the isolation temperature was changed and the isolation was measured at a wavelength of 1310 nm to obtain the results shown in FIG. 3. As the assembly wavelength increased, the peak position moved to the high temperature side, as shown in the Figure. When a λ=1318 assembly wavelength was used, and measurements taken at λ=1310, the isolation was about 30 dB at 0° C. and 29.5 dB at 70° C. When compared to devices assembled at λ=1310 nm, the peak point was shifted to a position at 35 ° C. The temperature coefficient of the Faraday rotator used was −0.06 deg/° C. In this case in order to move the peak by 12° C., it was necessary to use an assembly wavelength which was different from the usage wavelength by about 8 nm.

EXAMPLE 3

Figure 4:
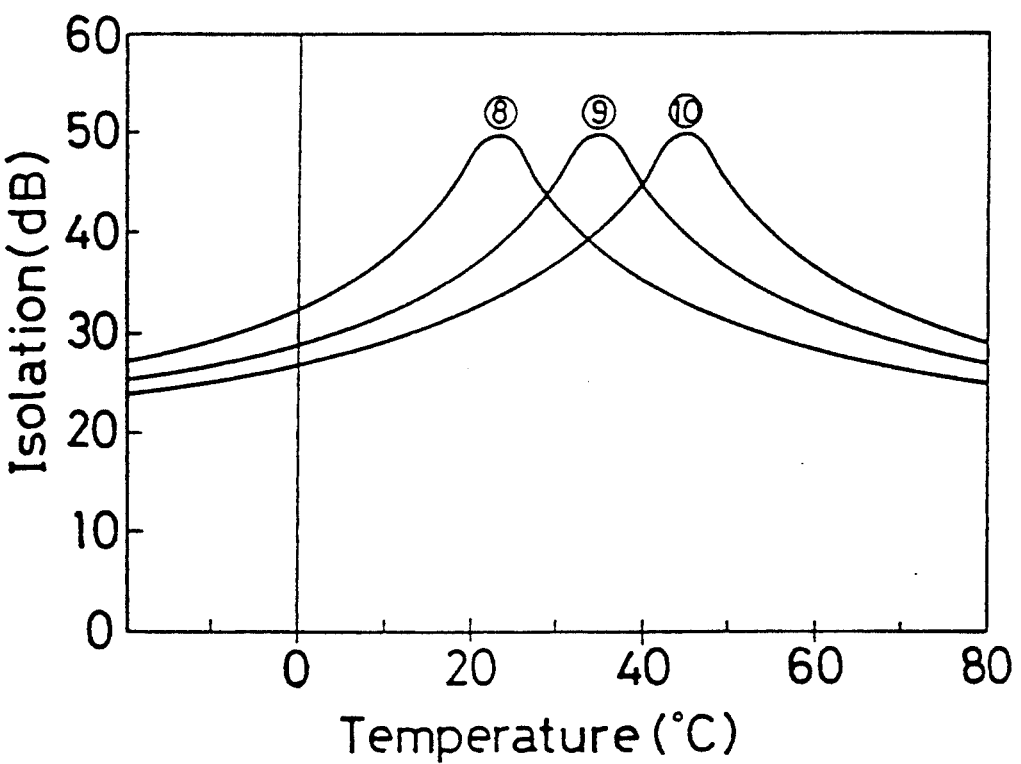
FIG. 4 is a graph showing the isolation temperature dependence of an optical isolator in which the assembly temperature is varied.

The same parts were used as in Example 2, but the assembly took place in constant temperature baths of 23° C. FIG. 4, curve (8), 35° C. FIG. 4, curve (9) and 45° C., FIG. 4, curve (10) in setting the maximum isolation. Affixing was performed using a fiber optic-guided YAG welding method in order to attach the isolator to a stainless steel holder. In this case, both the assembly wavelength and the measurement wavelength were λ=1310. FIG. 4 shows the characteristics of the optical isolators which were assembled at the above-mentioned temperatures. The unit which was assembled at 35° C. had an isolation of 29.0 dB at 0° C. and 29.5 dB at 70° C. Thus, it can be seen that about the same level of isolation is achieved in the optical isolators assembled as in Example 2 as is achieved when they are assembled at various temperatures.

EXAMPLE 4

An optical isolator was envisioned using a 1535 nm wavelength and having a maximum isolation temperature 45° C. Four devices were prepared using different assembly wavelengths and then temperature characteristics were measured. The LPE method was used in order to obtain a Bi-substituted rare earth iron garnet for the Faraday rotator. It had a temperature coefficient of −0.06 deg/° C. and a Faraday rotation wavelength coefficient of about −0.068 deg/nm, so the relationship between ΔT and Δλ was as follows:

−0.068 (deg/nm)×Δλ(nm)

−0.065 (deg/° C.)×(45–23) (° C.)

Figure 5:
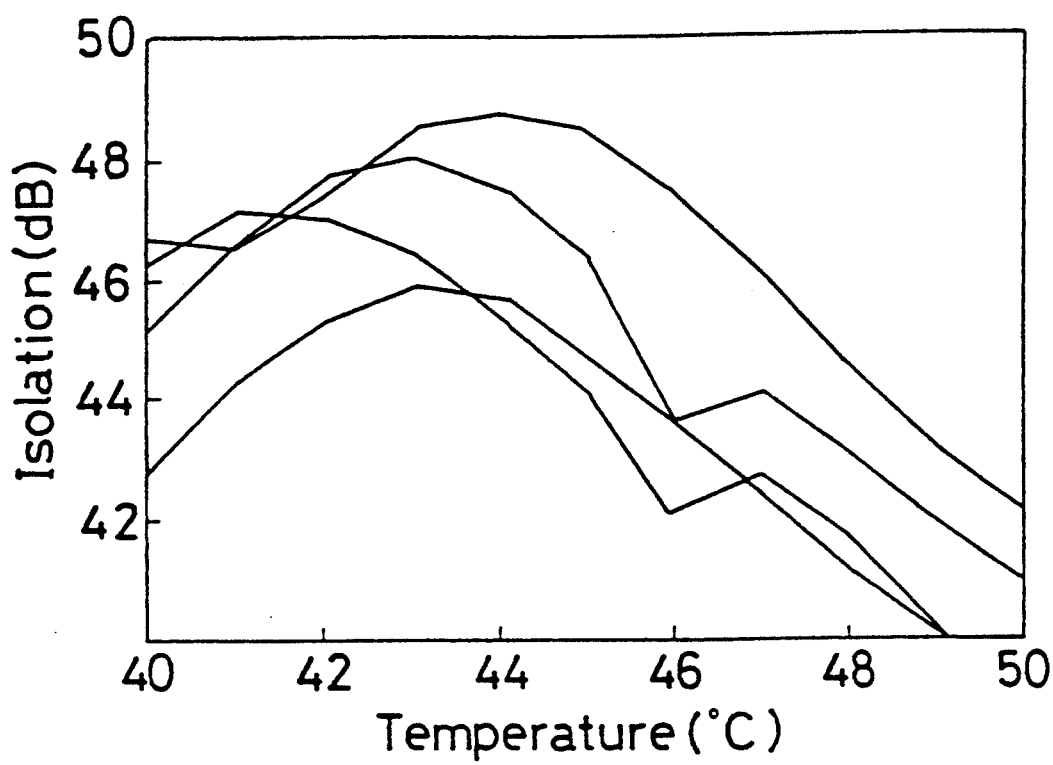
FIGS. 5 and 6 are graphs of data on isolation temperature characteristics of the optical isolator examples of this invention.

Therefore, Δλ=about 22nm. Thus, assembly took place using a wavelength 22 nm longer than 1535 nm: 557 nm. FIG. 5 shows the temperature characteristics of the 4 optical isolators. The maximum isolation was not at 45° C. but fell between 42 and 44° C. Thus, characteristics which were close to those forecast were obtained.

EXAMPLE 5

Figure 6:
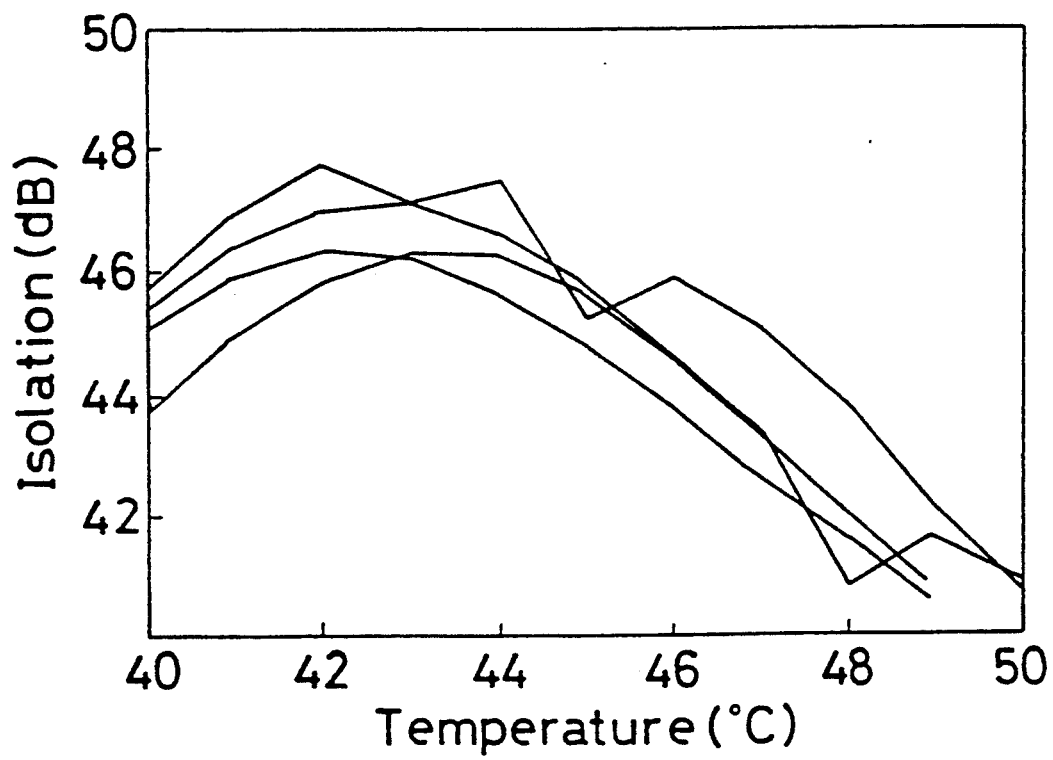

An optical isolator for use at 1310 nm wavelengths was prepared as in Example 4, but assembled using a wavelength 15 nm longer, 1325 nm. FIG. 6 shows the temperature characteristics.

Using the adjustment of the assembly wavelength according to this invention it is possible to control the maximum isolation temperature as desired in order to obtain high isolation characteristics in the temperature range where the device will be used. By setting the maximum isolation in the middle of this temperature range, it is possible to make effective utilization of extinction properties. When assembling with an LD, by using an assembly wavelength corresponding to the LD wavelength, one can easily manufacture optical isolators which are appropriate to the variations in wavelength inherent in LD production.

We claim:

1. An optical transmission arrangement comprising a source of light of wavelength λ and an optical isolator having a polarizer, an analyzer, a Faraday rotator formed of a material having a range of optical properties which decrease symmetrically as a function of temperature from a temperature at which a maximum value of said optical properties occurs and a permanent magnet which magnetizes the Faraday rotator into a Faraday rotation angle of approximately 45°; wherein said optical isolator has been assembled into an optical position, in which the temperature at which said maximum value of said optical properties occurs is room temperature, using a source of light having an adjusted assembly wavelength which minutely differs from the wavelength λ by a value Δλ in order to shift the temperature at which said maximum value of said optical properties occurs from said room temperature to a temperature in the middle of a temperature range in which the optical isolator is used with the light source of wavelength λ.

2. The arrangement according to claim 1, wherein Δλ is approximately 5-30 nm.

3. An optical transmission arrangement according to claim 2, wherein the Faraday rotation angle of said Faraday rotator has a temperature coefficient of $K_T$ and a wavelength coefficient of $K_\lambda$, and wherein the adjusted assembly wavelength difference value Δλ with respect to a temperature variation ΔT from the middle of the temperature range in which the arrangement is used with the light source of wavelength λ is:

$$\Delta = (K_T/K_\lambda)\Delta T$$

and as a means of setting the ±ΔT, the optical isolator has been assembled at room temperature $T_R$, using an assembly wavelength of λ±Δλ with respect to wavelength Δ so that maximum isolation will be achieved at the middle of the temperature range in which the arrangement will be used with the light source of wavelength Δ.

4. A method of assembling an optical isolator; having a polarizer, an analyzer a Faraday rotator formed of a material having a range of optical properties which decrease symmetrically as a function of temperature from a temperature at which a maximum value of said optical properties occurs and a permanent magnet which magnetizes the Faraday rotator into a Faraday rotation angle of approximately 45°, for use with a light source of light of wavelength λ comprising the steps of:
   A) determining a temperature range within which the optical isolator will be used;
   B) selecting a temperature in the middle of the temperature range determined;
   C) assembling the optical isolator into an optical position, in which said maximum value of said optical properties occurs at room temperature, using a light source of a wavelength which differs from wavelength λ by an amount ±Δλ which will shift the temperature at which said maximum value of said optical properties occurs from said room temperature to the selected temperature when the optical isolator is used with the light source of wavelength λ.

5. The method according to claim 4, wherein Δλ is selected in accordance with the equation:

$$\Delta\lambda = (K_T/K_\lambda)\Delta T$$

where $K_T$ is a temperature coefficient of the Faraday rotation angle of the Faraday rotation element, $K_\lambda$ is a wavelength coefficient, and ΔT is a temperature variation within the temperature range from the selected temperature.

* * * * *